L. J. MILLER.
COMBINATION COOKING UTENSIL.
APPLICATION FILED JAN. 6, 1916.
1,232,360.
Patented July 3, 1917.
2 SHEETS—SHEET 1.
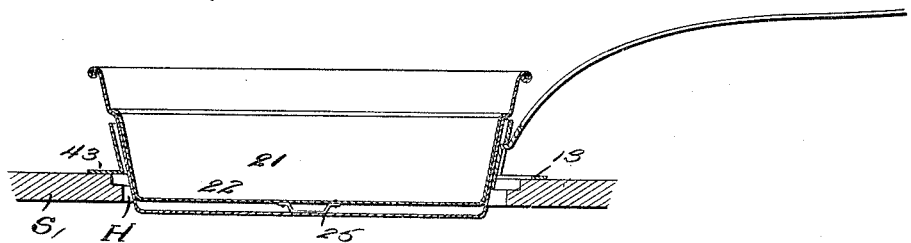
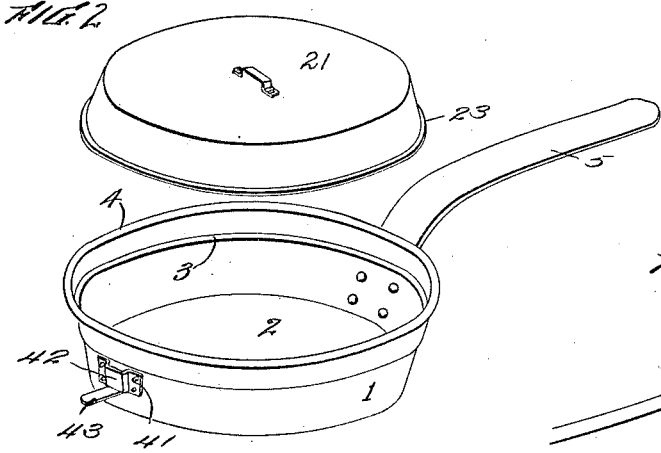
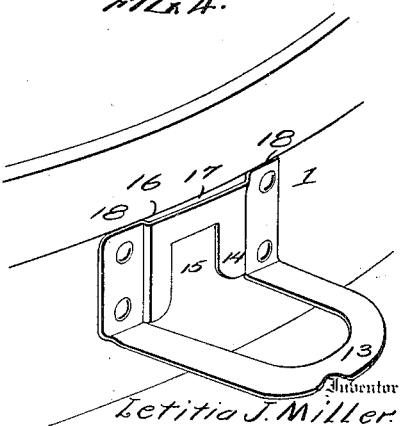
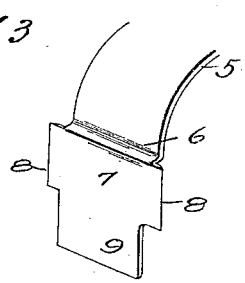

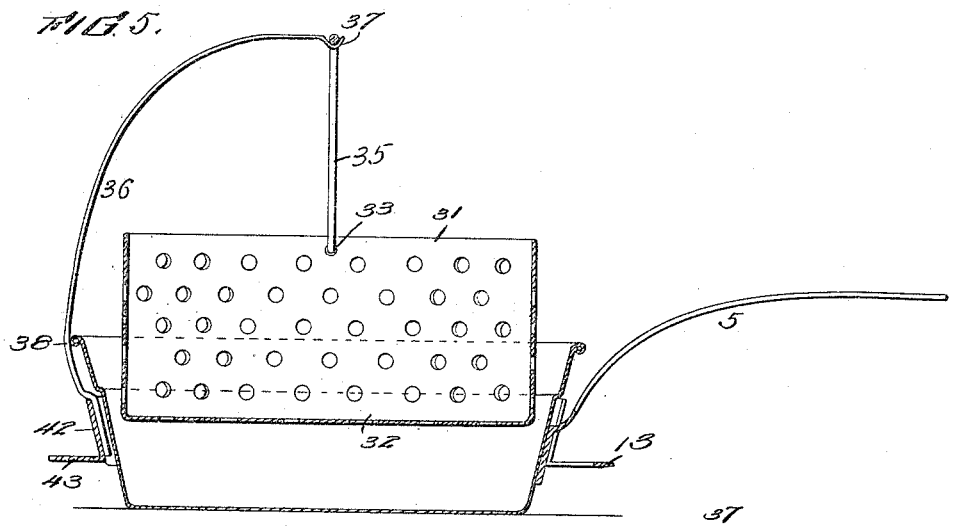
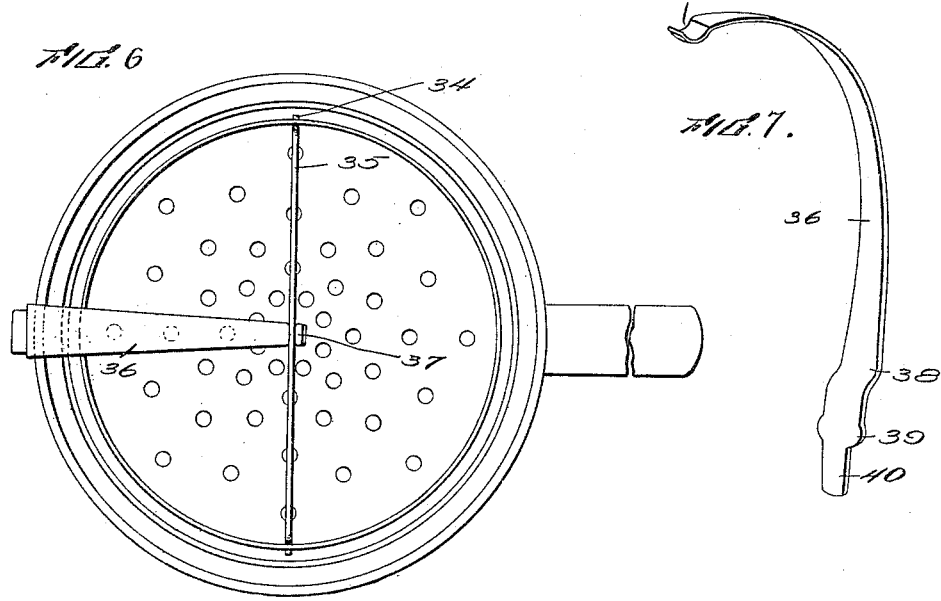

UNITED STATES PATENT OFFICE.

LETITIA J. MILLER, OF BRUNSWICK, GEORGIA.

COMBINATION COOKING UTENSIL.

1,232,360.  Specification of Letters Patent.  Patented July 3, 1917.

Application filed January 6, 1916. Serial No. 70,685.

*To all whom it may concern:*

Be it known that I, LETITIA J. MILLER, a citizen of the United States, residing at Brunswick, in the county of Glynn and State of Georgia, have invented certain new and useful Improvements in Combination Cooking Utensils; and I do hereby declare the following to be a full, clear, and exact description of the invention, such as will enable others skilled in the art to which it appertains to make and use the same.

This invention relates to domestic cooking vessels, and it comprises a number of elements capable of interchangeable use with each other according to the necessities of the case. Also it comprises a support for one of the inner elements, which support is itself made in two forms for use at different times as will be described. The invention also preferably includes a handle detachably connected with the main pan and capable of removal therefrom when the parts are to be stored in small compass. The following specification describes the preferred construction of my invention, reference being had to the drawings wherein:

Figure 1 is a vertical sectional view showing the pans as nested so as to produce a frying pan having a lining and a false bottom, the whole being here illustrated as supported in a pot hole of a stove top.

Fig. 2 is a perspective view of the pan and cover separated.

Fig. 3 is an enlarged perspective detail of the lower end of the detachable handle, and Fig. 4 a similar detail of the handle socket.

Fig. 5 is a vertical sectional view showing the dripper as supported within the main pan by a crane, Fig. 6 is a plan view of the same, and Fig. 7 is a perspective detail of the crane.

The principal element in this combination utensil is the pan 1, variously called hereinafter the outer pan and the frying pan. It is by preference stamped or spun from metal and is entirely without seams—thereby rendering it easy to clean and to keep clean, and impossible of springing a leak unless it receives an injury. Its bottom 2 is substantially flat, its walls flare upwardly and are provided at about the point shown with a shoulder 3, and its upper edge may be and preferably is beaded as shown at 4. I would make it of a circumference which will enable it to partly enter the smallest sized pot hole H in the stove top S which is now generally used, and in order that it may not pass too far down into the hole I preferably provide it with socket members having feet at opposite points as best seen in Fig. 1, and these members are purposely attached to the exterior of its walls with as little interruption as possible to their interior and located some distance above the pan bottom, for a purpose yet to appear.

One of said socket members may carry the handle, and by preference I make said handle of strap metal. While any suitable means may be provided for effecting its removal, I preferably curve the inner end of the handle 5 downward gently as seen in Fig. 3, give it a sharp bend as seen at 6 to produce a shoulder, then widen it a little to form a head 7 having ears 8 at both sides, and continue the handle beneath the head in a tongue 9. The handle socket is best seen in Fig. 4. It is of sheet metal having two ears 18 secured to the outer face of the wall of the pan 1 by any suitable means, and a loop 17 between said ears bent outward beyond them and connected with them by shoulders 16 as shown. The loop is notched as at 15 and the flanges 14 forming the side walls of said notch are adapted to be engaged by the ears 8 when the handle is inserted. To bring this about the tongue 9 and head 7 are passed downward beyond the loop and borne inward against the wall of the pan, and then they are drawn upward so that the ears 8 pass in behind the flanges 14 and the parts are engaged with each other in a manner which will be clear from Fig. 1. This handle socket may well carry one of the feet above referred to, and in Fig. 4 this foot is shown as a U-shaped extension 13 from the lower ends of the ears 18, the extension projecting horizontally from the side of the pan.

The second element of this combination utensil is an inner pan 21 capable of use as a lining as seen in Fig. 1 or as a cover as seen in Fig. 2. This pan also is by preference stamped or spun from a single piece of metal and without seams, and therefore it has the same advantages claimed for the outer pan. It is a trifle smaller in circumference and of somewhat less depth than the outer pan as will be seen from Fig. 1. It also has a preferably flat bottom 22, its walls flare upwardly at the same angle as the walls of the main or outer pan, and its upper edge is spread or bent outward into a flange 23 adapted to lie close on the shoulder 3 when the two pans are nested as seen in Fig. 1, or to support the inner pan 21 upon said shoulder when it is inverted and used as a cover as seen in Fig. 2. This inner pan has a small loop-shaped handle 25 of its own, which is secured to the center of its bottom as seen in Fig. 1 and therefore comes uppermost when this element is used as a cover; and I consider it important that the handle shall be of such size that when the pans are nested the handle rests on the flat bottom of the main pan at the same time that their flaring walls come into close contact with each other and the flange 23 rests on the shoulder 3. The result is that there is a space between the bottoms of the pans, or in other words the frying pan thus made up of the two elements has a false bottom supported at its center by the handle. The close contact of the walls at this time permits heat from the outer pan to warm the walls of the inner more quickly than if they were spaced. If it is desired to use this utensil as a double boiler, a little water is placed in the outer pan before the inner pan is inserted, and the water if sufficient will prevent the close contact of the side walls. If it does not do so a rack may first be laid in the bottom of the outer pan, or any device or devices which would hold the bottom of the inner pan at a little higher point than shown in Fig. 1; and this of course would raise its walls out of contact with those of the main pan. Such a utensil is produced by simply removing and inverting the inner pan 21 as already suggested. Fig. 2 shows how the element 21 which then becomes a cover can be lifted off.

The third element of this combination utensil is a dripper 31 whose uses are best shown in Figs. 5 and 6. This also is by preference stamped or spun from a single piece of metal, with a flat bottom 32 and straight upright walls, and it is perforated throughout as shown. At proper points near its upper edge it has eyes 33 with which are detachably engaged the out-turned or crooked ends 34 of a bail 35—thus rendering the latter removable when its use is not desired. The circumference of the dripper is such as to permit it to drop down into the main pan 1, whether the rack 26 is or is not used, (see dotted lines in Fig. 2), and various kinds of food can be cooked in this element in a manner well known to the housewife. For draining purposes the dripper will then be raised above the level of the liquid in the pan; and for holding it elevated I preferably use a crane 36 best shown in Figs. 5 and 7. This crane has a curved body, a hook 37 at its upper end, a sharp bend forming a shoulder 38 near its lower end, a head 39 below said shoulder, and a tongue 40 beneath the head. The socket member for receiving and supporting the crane is of metal comprising a pair of ears 41 secured to the outer face of the wall of the main pan, and an out-bent loop 42 between them, down into which loop the tongue 40 is inserted in a manner which is well shown in Fig. 5, and at this time the shoulder 38 passes around the beaded upper edge 4 of the pan 1 while the curvature of the crane is such as will bring its hook 37 at the proper point. This crane-socket is utilized to carry the other foot referred to above, to which end it is provided with a horizontal extension 43 best seen in Fig. 2, which rests on the top of the stove S at the same time that the foot 13 of the handle-socket also rests thereon as seen in Fig. 1.

What I claim is:

1. In a cooking utensil, the combination with a pan, a handle element mounted at one point upon its wall and having an out-turned foot, and a socket mounted upon the wall diametrically opposite said element and also having an out-turned foot, said feet standing in a single plane above the bottom of the pan; of a dripper element having a bail, and a crane for supporting said bail, the crane having a tongue detachably mounted in said socket.

2. In a cooking utensil, the combination of a frying pan, brackets attached to said pan at opposite sides and each having integral outwardly extending foot portions disposed in a plane above the bottom of the pan to support the latter in relation to a cover-hole in a stove, said brackets having central embossed or offset portions to receive insertible and removable members.

3. In combination, in a cooking utensil, a frying pan, socket devices attached to opposite sides of the pan, each having lateral flanges bearing upon the pan, fastening means passing through said flanges, an embossed intermediate portion forming a recess adjacent the pan surface, foot portions bent integrally from the lower edges of said devices to engage the rim of a hole in a stove top, and detachable members for engaging the socket devices.

In testimony whereof I affix my signature in presence of two witnesses.

LETITIA J. MILLER.

Witnesses:
F. E. TWILL,
DAVID H. POPE.

Copies of this patent may be obtained for five cents each, by addressing the "Commissioner of Patents, Washington, D. C."